United States Patent
Ohno et al.

(10) Patent No.: US 11,056,993 B2
(45) Date of Patent: Jul. 6, 2021

(54) ELECTRIC MOTOR CONTROL METHOD AND ELECTRIC MOTOR CONTROL DEVICE

(71) Applicant: Nissan Motor Co., Ltd., Kanagawa (JP)

(72) Inventors: Sho Ohno, Kanagawa (JP); Hiromichi Kawamura, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 16/768,752

(22) PCT Filed: Dec. 1, 2017

(86) PCT No.: PCT/JP2017/043336
§ 371 (c)(1),
(2) Date: Jun. 1, 2020

(87) PCT Pub. No.: WO2019/106838
PCT Pub. Date: Jun. 6, 2019

(65) Prior Publication Data
US 2021/0175827 A1  Jun. 10, 2021

(51) Int. Cl.
*H02P 21/22* (2016.01)
*H02P 21/00* (2016.01)
*H02P 27/08* (2006.01)

(52) U.S. Cl.
CPC .......... *H02P 21/22* (2016.02); *H02P 21/0003* (2013.01); *H02P 27/08* (2013.01)

(58) Field of Classification Search
CPC ...................................................... H02P 21/22
USPC ................................................... 318/400.02
See application file for complete search history.

(56) References Cited

FOREIGN PATENT DOCUMENTS

JP   2007-143235 A   6/2007

*Primary Examiner* — Erick D Glass
(74) *Attorney, Agent, or Firm* — Osha Bergman Watanabe & Burton LLP

(57) ABSTRACT

A control device includes an inverter, a sensor, a controller, and a filter. The inverter supplies power to an electric motor based on a control on the electric motor. The sensor detects a current supplied from the inverter to the electric motor. The controller executes current vector control by calculating a feedback command value and a feedforward compensation value based on a torque command value, the feedback command value being indicative of a voltage value for decreasing deviation in a supply current to the electric motor, the feedforward compensation value being a value for compensating the feedback command value. The filter performs a filtering process on the feedback command value to pass a low-frequency component of the feedback command value. When the control is switched to voltage phase control, the controller initializes the voltage phase control based on the feedforward compensation value and an output from the filter.

4 Claims, 6 Drawing Sheets

ELECTRIC MOTOR CONTROL METHOD AND ELECTRIC MOTOR CONTROL DEVICE

TECHNICAL FIELD

The present invention relates to an electric motor control method and an electric motor control device each for switching a control on an electric motor to another control in accordance with a state of the electric motor.

BACKGROUND ART

As an electric motor controlling technique, a current vector control in which a value of a supply current to an electric motor is fed back to a voltage command value, a voltage phase control in which a value of torque generated in the electric motor is fed back to a voltage phase command value, and so on have been known, for example. In terms of these controls, one of the controls is executed in accordance with an operating state of the electric motor in most cases.

As one of control devices, there has been proposed a control device configured such that, when a control on an electric motor is switched from the current vector control to the voltage phase control, a control state variable for the voltage phase control is initialized based on a voltage command value for the current vector control (JP 2007-143235 A).

SUMMARY OF INVENTION

However, in the abovementioned control device, a ripple may be superimposed on the voltage command value for the current vector control due to error characteristics of a current sensor for detecting a supply current to the electric motor, and so on. In such a case, when the control on the electric motor is switched from the current vector control to the voltage phase control, the torque of the electric motor might fluctuate due to a ripple component of the voltage command value.

An object of the present invention is to provide a control method and an electric motor control device each for restraining torque fluctuation in an electric motor, the torque fluctuation being caused when a control on the electric motor is switched to a voltage phase control.

According to an aspect of this invention, an electric motor control method is for executing either one of a current vector control and a voltage phase control in accordance with an operating state of an electric motor such that electric power to be supplied to the electric motor is controlled. The electric motor control method includes a current controlling step of outputting a voltage command value for the current vector control by calculating a feedback command value and a feedforward compensation value based on a torque command value for the electric motor. The feedback command value is indicative of a voltage value for decreasing a deviation in a supply current to the electric motor and the feedforward compensation value is a value for compensating the feedback command value. The electric motor control method also includes a switching controlling step of initializing the voltage phase control based on a calculation value for the current vector control when a control on the electric motor is switched from the current vector control to the voltage phase control and a voltage phase controlling step of outputting a voltage command value for the voltage phase control by executing a feedback control on a predetermined voltage phase command value based on the torque command value for the electric motor. In the switching controlling step, a filtering process is performed on the feedback command value such that a low-frequency component of the feedback command value is passed and an initial value for the voltage phase command value is calculated by use of the feedforward compensation value and the feedback command value on which the filtering process is performed.

DESCRIPTION OF EMBODIMENTS

With reference to the attached drawings, the following describes embodiments of the present invention.

First Embodiment

Figure 1:
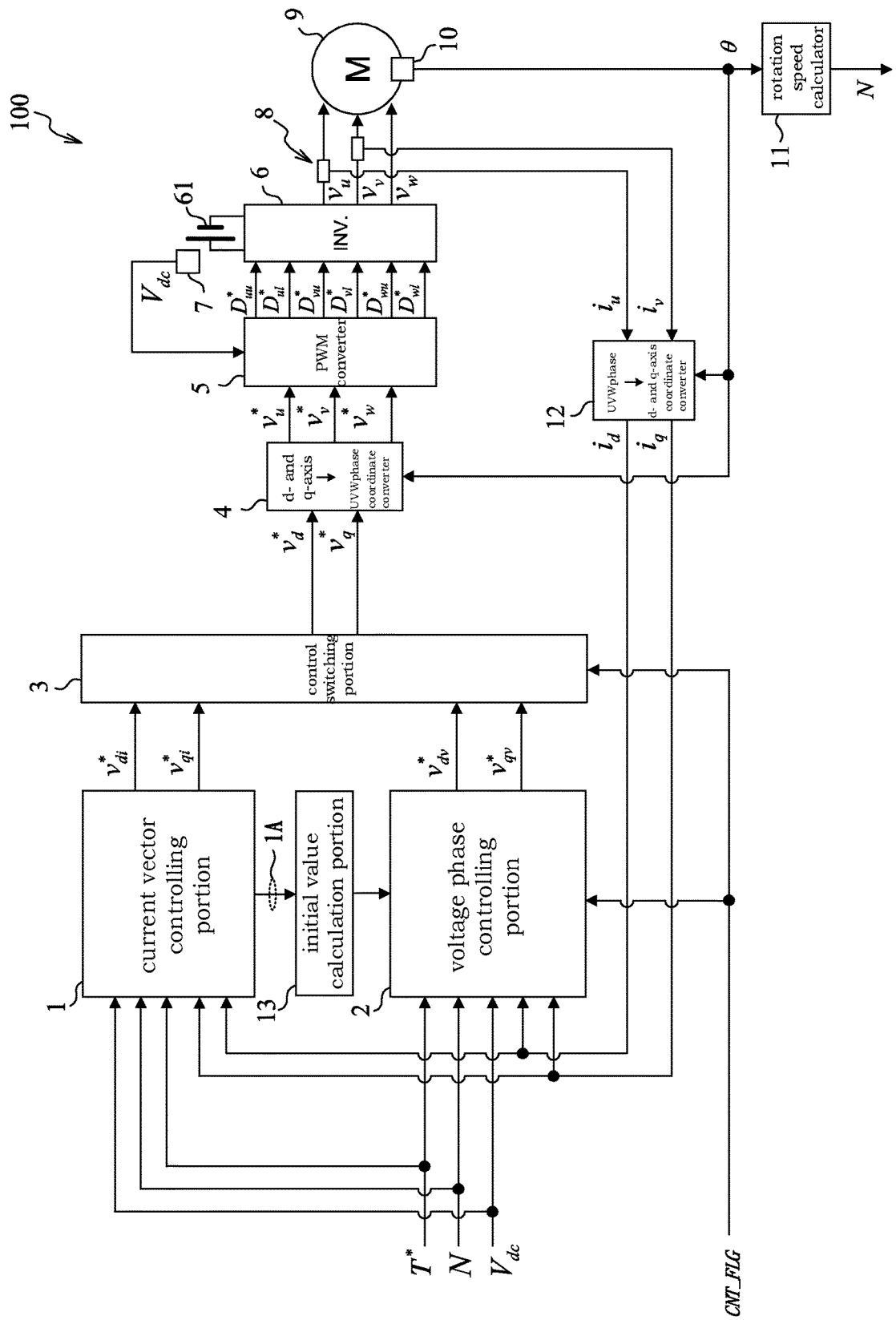
FIG. 1 is a view illustrating an exemplary configuration of an electric motor control device in an embodiment of the present invention.

FIG. 1 is a view illustrating an exemplary configuration of an electric motor control device 100 in a first embodiment of the present invention.

The control device 100 controls electric power to be supplied to an electric motor 9 by executing a process programmed in advance. The control device 100 is constituted by one or more controllers, for example.

The control device 100 includes a current vector controlling portion 1, a voltage phase controlling portion 2, a control switching portion 3, a coordinate converter 4, a PWM converter 5, an inverter 6, a battery voltage detector 7, an electric motor current detector 8, and the electric motor 9. Further, the control device 100 includes a rotor detector 10, a rotation speed calculator 11, a coordinate converter 12, and an initial value calculation portion 13.

The current vector controlling portion 1 executes a current vector control such that torque generated in the electric motor 9 converges to a predetermined torque command value T*. The current vector control as used herein is a control mode in which an operation of the electric motor 9 is controlled by changing the direction and the magnitude of a vector related to a supply current to the electric motor 9.

Based on the torque command value T* for the electric motor 9, the current vector controlling portion 1 executes a feedback control such that a current value of the electric power supplied from a battery 61 to the electric motor 9 via the inverter 6 is fed back to voltage command values $v_{di}^*$ and $v_{qi}^*$.

By use of the torque command value T* for the electric motor 9, a rotation speed detection value N, and a battery voltage detection value $V_{dc}$, the current vector controlling portion 1 of the present embodiment feeds back a d-axis current detection value $i_d$ to the d-axis voltage command value $v_{di}^*$ and feeds back a q-axis current detection value $i_q$ to the q-axis voltage command value $v_{qi}^*$. The d-axis current detection value $i_d$ and the q-axis current detection value $i_q$ as used herein indicate a value of a d-axis component and a value of a q-axis component of the supply current to the electric motor 9, respectively. The d-axis and the q-axis are coordinate axes perpendicular to each other.

The current vector controlling portion 1 outputs the d-axis voltage command value $v_{di}^*$ and the q-axis voltage command value $v_{qi}^*$ calculated by the feedback control to the control switching portion 3 as voltage command values for the current vector control.

The voltage phase controlling portion 2 executes a voltage phase control such that the torque generated in the electric motor 9 converges to the torque command value T*. The voltage phase control as used herein is a control mode in which the operation of the electric motor 9 is controlled by changing a voltage phase that is a phase between supply voltages to respective phases of the electric motor 9.

Based on the torque command value T*, the voltage phase controlling portion 2 executes a feedback control such that a current value of the electric power supplied from the battery 61 to the electric motor 9 via the inverter 6 is fed back to voltage command values $v_{dv}^*$ and $v_{qi}^*$.

By use of the torque command value T*, the rotation speed detection value N, and the battery voltage detection value $V_{dc}$, the voltage phase controlling portion 2 of the present embodiment calculates a predetermined voltage amplitude command value and a voltage phase command value and performs feedback on the voltage phase command value by use of the d-axis and q-axis current detection values $i_d$ and $i_q$. The voltage phase controlling portion 2 outputs the d-axis voltage command value $v_{dv}^*$ and the q-axis voltage command value $v_{qv}^*$ calculated by the feedback control to the control switching portion 3 as voltage command values for the voltage phase control.

The control switching portion 3 switches the control on the electric motor 9 to either one control out of the current vector control and the voltage phase control in accordance with a control mode flag CNT_FLG.

An identifier of the control mode flag CNT_FLG is changed in accordance with the operating state of the electric motor 9. In the present embodiment, an identifier indicative of the current vector control is "1," an identifier indicative of the voltage phase control is "2," and an identifier indicative of another control executed in case of emergency is "3."

The identifier is set to the control mode flag CNT_FLG by use of the torque command value T*, the d-axis current detection value $i_d$, the rotation speed detection value N, and so on indicative of the operating state of the electric motor 9. For example, when the torque of the electric motor 9 is low, the identifier indicative of the current vector control is set to the control mode flag CNT_FLG, and when the magnitude of a current vector reaches a predetermined threshold, the identifier indicative of the voltage phase control is set.

The control switching portion 3 outputs values calculated by a control selected from at least the current vector control and the voltage phase control to the coordinate converter 4 as d-axis and q-axis final voltage command values $v_d^*$ and $v_q^*$.

As expressed by Expression (1), the coordinate converter 4 converts the d-axis and q-axis final voltage command values $v_d^*$ and $v_q^*$ into three phase voltage command values $v_u^*$, $v_v^*$, and $v_w^*$ based on an electric angle detection value θ of the electric motor 9.

Math. 1

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_{d\_fin}^* \\ v_{q\_fin}^* \end{bmatrix} \quad (1)$$

Based on the battery voltage detection value $V_{dc}$ of the battery 61, the PWM converter 5 converts the three phase voltage command values $v_u^*$, $v_v^*$, and $v_w^*$ into power element driving signals $D_{uu}^*$, $D_{ul}^*$, $D_{vu}^*$, $D_{vl}^*$, $D_{wu}^*$, and $D_{wl}^*$ for driving power elements placed in the inverter 6. The PWM converter 5 supplies, to the power elements of the inverter 6, the power element driving signals $D_{uu}^*$, $D_{ul}^*$, $D_{vu}^*$, $D_{vl}^*$, $D_{wu}^*$, and $D_{wl}^*$ thus converted.

Based on the power element driving signals $D_{uu}^*$, $D_{ul}^*$, $D_{vu}^*$, $D_{vl}^*$, $D_{wu}^*$, and $D_{wl}^*$, the inverter 6 converts a direct-current voltage of the battery 61 into three phase alternating current voltages $v_u$, $v_v$, and $v_w$ for driving the electric motor 9. The inverter 6 supplies, to respective phases of the electric motor 9, the three phase alternating current voltages $v_u$, $v_v$, and $v_w$ thus converted.

The battery voltage detector 7 detects a voltage of the battery 61 connected to the inverter 6. The battery voltage detector 7 outputs the battery voltage detection value $V_{dc}$ indicative of a value of the detected voltage to the current vector controlling portion 1 and the voltage phase controlling portion 2.

The electric motor current detector 8 detects at least two phase alternating currents from three phase alternating currents $i_u$, $i_v$, and $i_w$ supplied from the inverter 6 to respective phases of the electric motor 9. The electric motor current detector 8 of the present embodiment detects the alternating currents $i_u$ and $i_v$ of a U-phase and a V-phase and outputs the alternating currents $i_u$ and $i_v$ thus detected to the coordinate converter 12.

The electric motor 9 is a motor including winding wires for a plurality of phases (e.g., winding wires for three phases U, V, and W) and configured to be rotationally driven by supplying alternating-current power to the winding wires of the phases. The electric motor 9 can be used as a drive source for an electric vehicle and so on. For example, the electric motor 9 is achieved by an IPM (Interior Permanent Magnet) type three-phase synchronous motor.

The rotor detector 10 detects an electric angle of the electric motor 9. The rotor detector 10 outputs the electric angle detection value θ indicative of a value of the detected electric angle to the coordinate converter 4 and the coordinate converter 12 and also outputs the electric angle detection value θ to the rotation speed calculator 11.

The rotation speed calculator 11 calculates a rotation speed of the electric motor 9 from a change amount per time of the electric angle detection value θ. The rotation speed calculator 11 outputs the rotation speed detection value N indicative of a value of the rotation speed thus calculated to the current vector controlling portion 1 and the voltage phase controlling portion 2.

The coordinate converter 12 converts the alternating currents $i_u$ and $i_v$ of the U-phase and the V-phase into the d-axis current detection value $i_d$ and the q-axis current detection value $i_q$ based on the electric angle detection value θ of the electric motor 9 as expressed by Expression (2). The coordinate converter 12 outputs the d-axis current detection value $i_d$ and the q-axis current detection value $i_q$ to the current vector controlling portion 1 and the voltage phase controlling portion 2.

Math. 2

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ -i_u - i_v \end{bmatrix} \quad (2)$$

The initial value calculation portion 13 initializes the voltage phase controlling portion 2 based on calculation values in the current vector controlling portion 1. For example, in a case where the control on the electric motor 9 is switched from the current vector control to the voltage phase control, the initial value calculation portion 13 resets a state variable of the voltage phase controlling portion 2 based on the calculation values in the current vector controlling portion 1.

When the identifier shown by the control mode flag CNT_FLG is switched from "1" to "2," the initial value calculation portion 13 of the present embodiment sets the state variable of the voltage phase controlling portion 2 to its initial value based on the calculation values in the current vector controlling portion 1.

Figure 2:
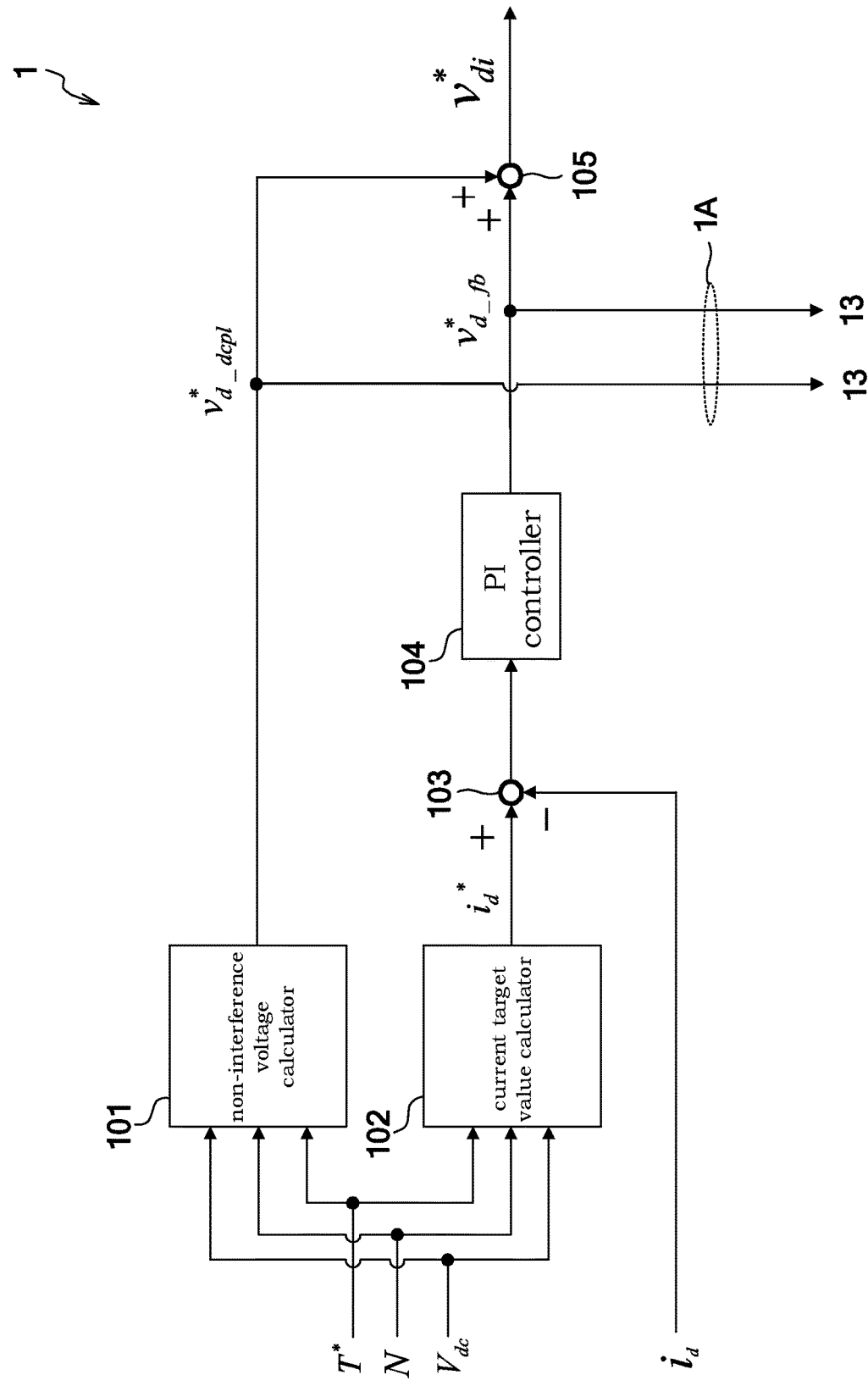
FIG. 2 is a block diagram illustrating an exemplary configuration of a current vector controlling portion of the control device in the present embodiment.

FIG. 2 is a block diagram illustrating an exemplary configuration of the current vector controlling portion 1 in the present embodiment. A configuration to calculate the d-axis voltage command value $v_{di}^*$ and a configuration to calculate the q-axis voltage command value $v_{qi}^*$ are similar to each other, and therefore, only the configuration to calculate the d-axis voltage command value $v_{di}^*$ will be described here.

The current vector controlling portion 1 includes a non-interference voltage calculator 101, a current target value calculator 102, a subtractor 103, a PI controller 104, and an adder 105.

The non-interference voltage calculator 101 calculates a feedforward compensation value for compensating the d-axis voltage command value $v_{di}^*$ based on the torque command value T*.

Based on the torque command value T*, the rotation speed detection value N, and the battery voltage detection value $V_{dc}$, the non-interference voltage calculator 101 in the present embodiment calculates, as the feedforward compensation value, a non-interference voltage value $v_{d\_dcpl}^*$ that cancels interference voltages that interfere with each other between the d-axis and the q-axis. The non-interference voltage calculator 101 outputs the non-interference voltage value $v_{d\_dcpl}^*$ thus calculated to the adder 106.

For example, a non-interference table determined in advance is stored in the non-interference voltage calculator 101. In the non-interference table, a corresponding non-interference voltage value $v_{d\_dcpl}^*$ is associated with each operating point specified by the torque command value T*, the rotation speed detection value N, and the battery voltage detection value $V_{dc}$.

The non-interference voltage calculator 101 acquires respective parameters of the torque command value T*, the rotation speed detection value N, and the battery voltage detection value $V_{dc}$. By referring to the above non-interference table, the non-interference voltage calculator 101 specifies an operating point of the electric motor 9 by the parameters and calculates a non-interference voltage value $v_{d\_dcpl}^*$ corresponding to the operating point.

The current target value calculator 102 calculates a d-axis current target value $i_d^*$ for the electric motor 9 based on the torque command value T* so as to decrease a deviation in the supply current to the electric motor 9.

Similarly to the non-interference voltage calculator 101, based on the torque command value T*, the rotation speed detection value N, and the battery voltage detection value $V_{dc}$, the current target value calculator 102 in the present embodiment refers to a current table determined in advance and calculates the d-axis current target value $i_d^*$.

For example, in the current table, a corresponding d-axis current target value $i_d^*$ is associated with each operating point specified by the torque command value T*, the rotation speed detection value N, and the battery voltage detection value Vac. In the d-axis current target value $i_d^*$ in the current table, a current value to the electric motor 9 that is necessary for the electric motor 9 to operate in accordance with the torque command value T* and maximizes efficiency of the electric motor 9 is stored.

The current value to be stored in the current table is set appropriately based on experimental data, simulation, or the like. The current target value calculator 102 outputs the d-axis current target value $i_d^*$ thus calculated to the initial value calculation portion 13 and the subtractor 103.

The subtractor 103 subtracts the d-axis current detection value $i_d$ from the d-axis current target value $i_d^*$ and outputs a value obtained by the subtraction to the PI controller 104 as a d-axis current deviation.

The PI controller 104 calculates a feedback command value based on the torque command value T*, the feedback command value being indicative of a voltage value that decreases a deviation in the supply current to the electric motor 9.

The PI controller 104 in the present embodiment executes a current feedback control in which the d-axis current deviation is fed back to the d-axis voltage command value $v_d^*$ so that the d-axis current detection value $i_d$ follows the d-axis current target value $i_d^*$.

For example, the PI controller 104 calculates, as the feedback command value, a current FB voltage command value $v_{d\_fb}^*$ based on a d-axis current deviation $i_{d\_err}$ ($=i_d^* - i_d$) as expressed by Expression (3).

Math. 3

$$v_{d\_fb}^* = \frac{K_{dp}s + K_{di}}{s}(i_d^* - i_d) = \left(K_{dp} + \frac{1}{s}K_{di}\right)i_{d\_err} \quad (3)$$

Note that $K_{dp}$ indicates a d-axis proportional gain, and $K_{di}$ indicates a d-axis integral gain. The d-axis proportional gain $K_{dp}$ and the d-axis integral gain $K_{di}$ are found through experimental data, a simulation result, or the like.

Thus, the PI controller 104 calculates a d-axis current FB voltage command value $v_{d\_fb}^*$ by finding a sum of a multiplication value and an integral value ($K_{di}/s$) of the d-axis current deviation $i_{d\_err}$, the multiplication value being obtained by multiplying the d-axis current deviation $i_{d\_err}$ by the d-axis proportional gain $K_{dp}$.

The PI controller 104 outputs the current FB voltage command value $v_{d\_fb}^*$ to the initial value calculation portion 13 and outputs the current FB voltage command value $v_{d\_fb}^*$ to the adder 105.

The adder 105 adds the non-interference voltage value $v_{d\_dcpl}*$ to the current FB voltage command value $v_{d\_fb}*$ as expressed by Expression (4) and outputs a value obtained by the addition to the control switching portion 3 as the d-axis voltage command value $v_{di}*$ for the current vector control.

Math. 4

$$v_{di}* = v_{d\_dcpl}* + v_{d\_fb} \quad (4)$$

Thus, the current vector controlling portion 1 outputs the d-axis voltage command value $v_{di}*$ for the current vector control by finding the d-axis current FB voltage command value $v_{d\_fb}*$ and the non-interference voltage value $v_{d\_dcpl}*$ that is the d-axis feedforward compensation value based on the torque command value T*.

With reference to FIG. 2, the configuration in which the d-axis voltage command value $v_{di}*$ for the current vector control is calculated is described. However, a configuration in which a q-axis voltage command value $v_{qi}*$ is calculated is also a configuration similar to the configuration illustrated in FIG. 2.

Accordingly, based on the torque command value T*, the current vector controlling portion 1 calculates current FB voltage command values $v_{d\_fb}*$ and $v_{q\_fb}*$ that decrease respective deviations of d-axis and q-axis current components of the supply power to the electric motor 9. Further, the current vector controlling portion 1 calculates the d-axis and q-axis voltage command values $v_{di}*$ and $v_{qi}*$ for the current vector control by calculating d-axis and q-axis non-interference voltage values $v_{d\_dcpl}*$ and $v_{q\_dcpl}*$ for compensating the current FB voltage command values $v_{d\_fb}*$ and $v_{q\_fb}*$ thus calculated.

Note that the configuration in which the q-axis voltage command value $v_{qi}*$ for the current vector control is calculated is not described herein because the description is redundant.

Figure 3:
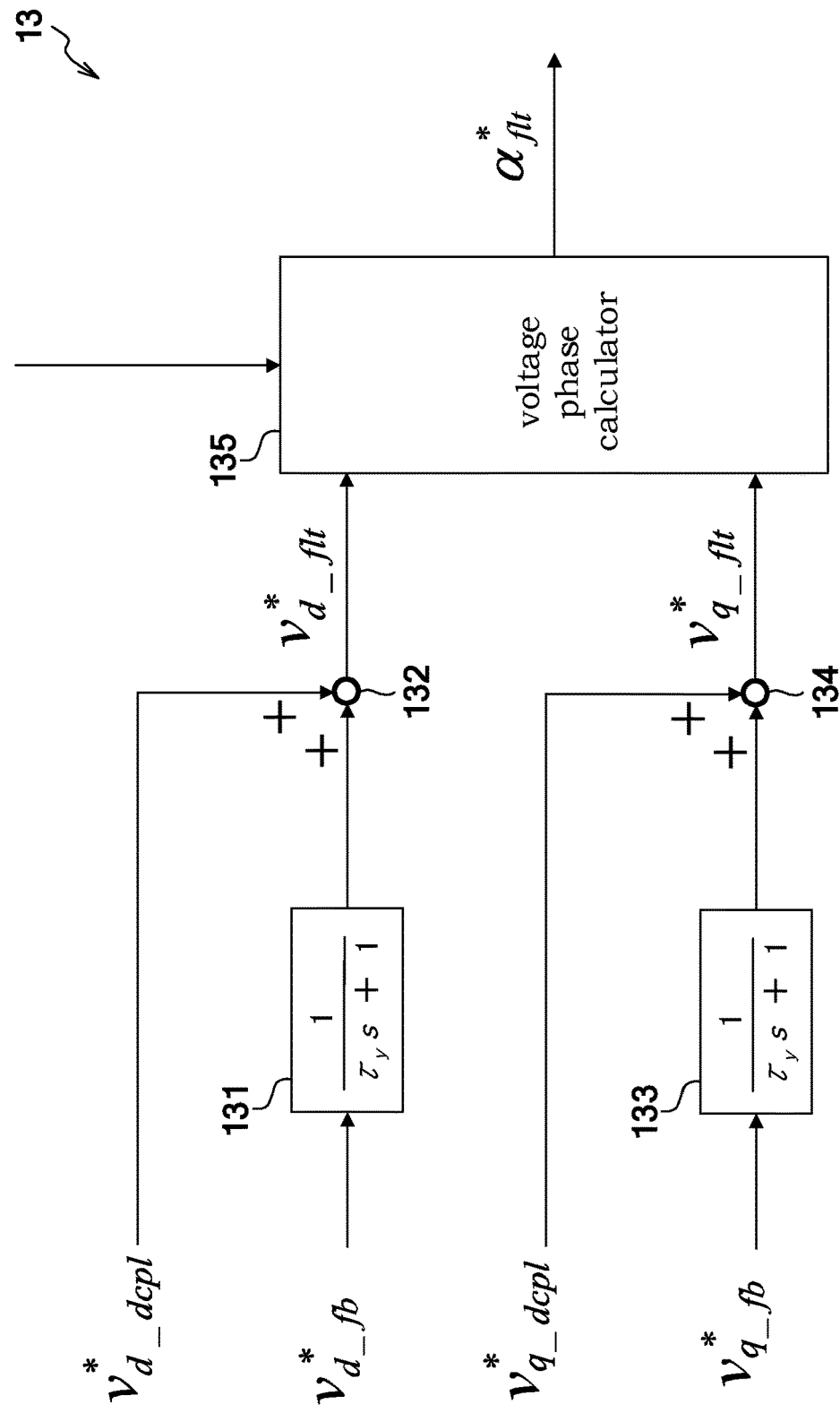
FIG. 3 is a block diagram illustrating an exemplary configuration of an initial value calculation portion of the control device in the present embodiment.

FIG. 3 is a block diagram illustrating an exemplary configuration of the initial value calculation portion 13 in the present embodiment.

The initial value calculation portion 13 includes a d-axis filter 131, a d-axis adder 132, a q-axis filter 133, a q-axis adder 134, and a voltage phase calculator 135.

The d-axis filter 131 is a lowpass filter configured to pass a low-frequency component of the d-axis current FB voltage command value $v_{d\_fb}*$ as a calculation value of the current vector controlling portion 1. That is, the d-axis filter 131 performs a filtering process on a feedback command value constituting the d-axis voltage command value $v_{di}*$ such that a low-frequency component of the feedback command value is passed. Hereby, a ripple component of the d-axis voltage command value $v_{di}*$ is removed, the ripple component being caused due to the current feedback control.

The d-axis filter 131 of the present embodiment performs a filtering process as expressed by Expression (5) on the d-axis current FB voltage command value $v_{d\_fb}*$. Note that $\tau_y$ in Expression (5) is a time-constant of the filter and is found through experimental data, a simulation result, or the like so that the ripple component of the d-axis voltage command value $v_{di}*$ is removed.

Math. 5

$$v_{d\_fb\_flt}^* = \frac{1}{\tau_y s + 1} v_{d\_fb}^* \quad (5)$$

The d-axis filter 131 outputs, to the d-axis adder 132, a filtered current FB voltage command value $v_{d\_fb\_flt}*$.

The d-axis adder 132 adds the d-axis non-interference voltage value $v_{d\_dcpl}*$ as a calculation value of the current vector controlling portion 1 to the filtered current FB voltage command value $v_{d\_fb\_flt}*$. The d-axis adder 132 outputs, to the voltage phase calculator 135, a value obtained by the addition as a filtered d-axis voltage command value $v_{d\_flt}*$.

The q-axis filter 133 is a lowpass filter configured to pass a low-frequency component of the q-axis current FB voltage command value $v_{q\_fb}*$ as a calculation value of the current vector controlling portion 1. That is, the q-axis filter 133 performs a filtering process on a feedback command value constituting the q-axis voltage command value $v_{qi}*$ such that a low-frequency component of the feedback command value is passed.

The q-axis filter 133 of the present embodiment performs the filtering process as expressed by Expression (5) on the q-axis current FB voltage command value $v_{q\_fb}*$, similarly to the d-axis filter 131. Hereby, a ripple component of the q-axis voltage command value $v_{qi}*$ is removed, the ripple component being caused due to the current feedback control. The q-axis filter 133 outputs, to the q-axis adder 134, a filtered current FB voltage command value $v_{q\_fb\_flt}*$.

The q-axis adder 134 adds the q-axis non-interference voltage value $v_{q\_dcpl}*$ as a calculation value of the current vector controlling portion 1 to the filtered current FB voltage command value $v_{q\_fb\_flt}*$. The q-axis adder 134 outputs, to the voltage phase calculator 135, a value obtained by the addition as a filtered q-axis voltage command value $v_{q\_flt}*$.

Based on the calculation values of the current vector controlling portion 1, the voltage phase calculator 135 calculates an initial value $\alpha_{flt}*$ for the voltage phase command value so as to initialize the voltage phase controlling portion 2 illustrated in FIG. 1.

The voltage phase calculator 135 in the present embodiment calculates the initial value $\alpha_{flt}*$ for the voltage phase command value based on the filtered d-axis and q-axis voltage command values $v_{d\_flt}*$ and $v_{q\_flt}*$. That is, the voltage phase calculator 135 initializes the voltage phase controlling portion 2 by use of the non-interference voltage values $v_{d\_dcpl}*$ and $v_{q\_dcpl}*$ and the filtered current FB voltage command values $v_{d\_fb\_flt}*$ and $v_{q\_fb\_flt}*$.

For example, the voltage phase calculator 135 calculates a voltage phase command value by use of the filtered d-axis and q-axis voltage command values $v_{d\_flt}*$ and $v_{q\_flt}*$ as expressed by Expression (6) and outputs a value thus calculated to the voltage phase controlling portion 2 as the initial value $\alpha_{\_flt}*$.

Math. 6

$$\alpha_{flt}^* = \begin{cases} \arctan(-v_{d\_flt}^* / v_{q\_flt}^*) & (N \geq 0) \\ \arctan(v_{d\_flt}^* / -v_{q\_flt}^*) & (N < 0) \end{cases} \quad (6)$$

Accordingly, when the rotation speed detection value N is equal to or more than zero, that is, when the electric motor 9 is in a powering state, the voltage phase calculator 135 calculates the initial value $\alpha_{flt}*$ for the voltage phase command value by use of an upper expression in Expression (6). When the rotation speed detection value N is less than zero, that is, when the electric motor 9 is in a regeneration state, the voltage phase calculator 135 calculates the initial value $\alpha_{flt}*$ by use of a lower expression.

As such, the initial value calculation portion 13 performs a lowpass filtering process only on feedback components ($v_{d\_fb}*$ and $v_{q\_fb}*$) of the voltage command values $v_{di}*$ and $v_{qi}^*$ of the current vector controlling portion 1. Hereby, the lowpass filtering process is not performed on feedforward components ($v_{d\_dcpl}^*$ and $v_{q\_dcpl}^*$), so that a delay in the control on the electric motor 9 can be restrained, and the ripple components of the voltage command values $v_{di}^*$ and $v_{qi}^*$ can be accurately removed, the ripple components being caused due to the current feedback control.

Accordingly, it is possible to avoid such a situation that a deviation in the initial value $\alpha_{fit}^*$ set to the voltage phase command value for the voltage phase controlling portion 2 when the control on the electric motor 9 is switched from the current vector control to the voltage phase control becomes excessive due to ripple noises of the voltage command values $v_{di}^*$ and $v_{qi}^*$.

Note that, in the present embodiment, the lowpass filtering process is performed on both the d-axis and q-axis current FB voltage command values $v_{d\_fb}^*$ and $v_{q\_fb}^*$ so as to remove the ripple components, but the lowpass filtering process may be performed only on either one of them. Even in this case, it is possible to restrain a deviation in the initial value $\alpha_{fit}^*$ for the voltage phase command value.

Figure 4:
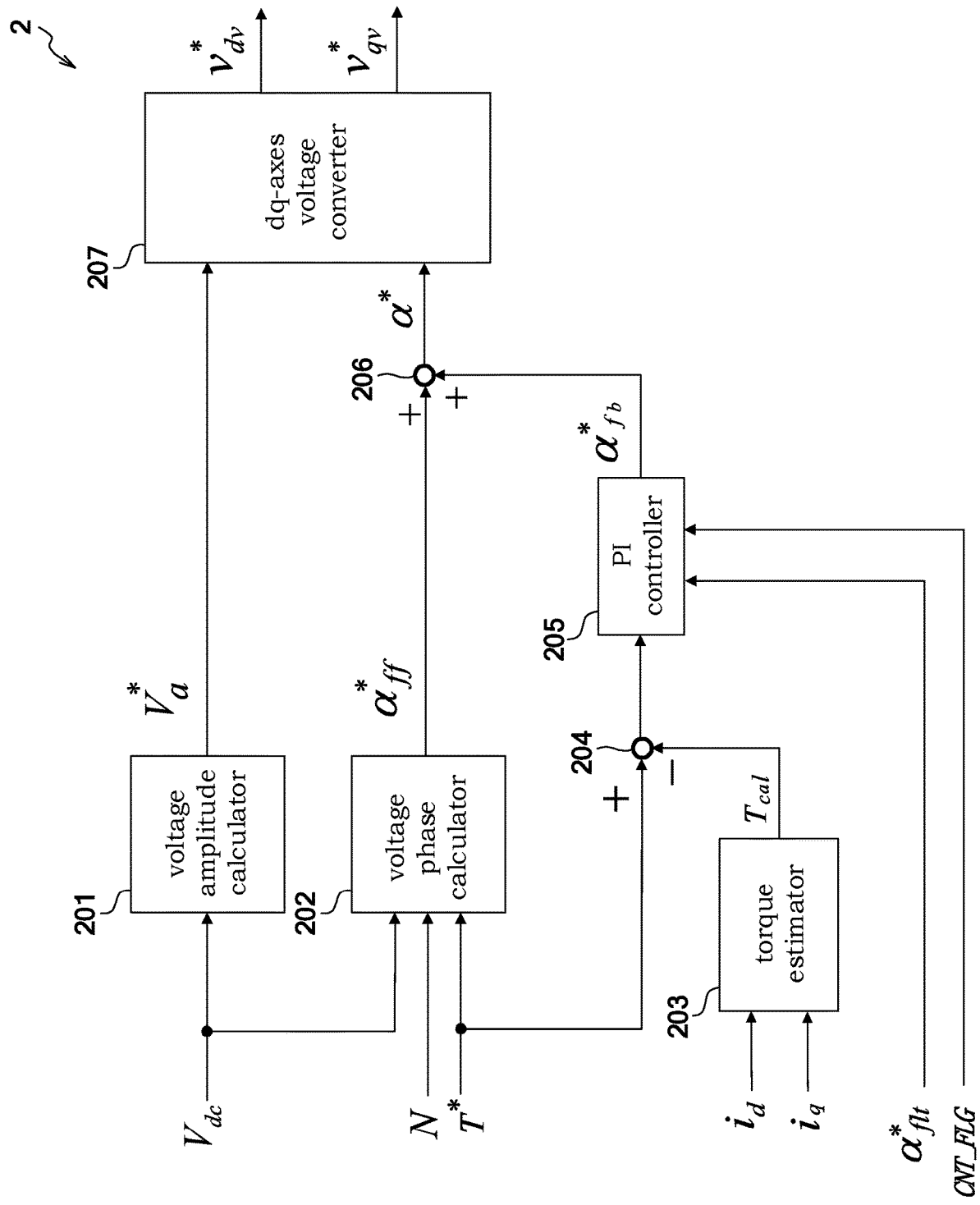
FIG. 4 is a block diagram illustrating an exemplary configuration of a voltage phase controlling portion of the control device in the present embodiment.

FIG. 4 is a block diagram illustrating an exemplary configuration of the voltage phase controlling portion 2 in the present embodiment.

The voltage phase controlling portion 2 includes a voltage amplitude calculator 201, a voltage phase calculator 202, a torque estimator 203, a torque deviation calculator 204, a PI controller 205, a voltage phase adder 206, and a dq-axes voltage converter 207.

The voltage amplitude calculator 201 calculates a predetermined voltage amplitude command value $V_a^*$ based on a modulation rate command value M* determined in advance. The modulation rate command value M* as used herein indicates a reference value of a modulation rate in the voltage phase control. The modulation rate in the voltage phase control is a rate of the amplitude of a fundamental wave component of an interphase voltage in the electric motor 9 with respect to the battery voltage detection value Vac. The interphase voltage of the electric motor 9 is a voltage ($v_u$-$v_v$) between the U-phase and the V-phase, for example.

In general, a range where the modulation rate in the voltage phase control is from 0.0 to 1.0 corresponds to a normal modulation region in which a pseudo-sinusoidal voltage can be generated by PWM modulation. On the other hand, a range where the modulation rate exceeds 1.0 corresponds to an overmodulation region, and even when a pseudo-sine wave is to be generated, the maximum value and the minimum value of the fundamental wave component of the interphase voltage are restricted. For example, when the modulation rate increases to about 1.1, the fundamental wave component of the interphase voltage has a waveform similar to a so-called rectangular wave voltage.

The voltage amplitude calculator 201 of the present embodiment changes the voltage amplitude command value $V_a^*$ in accordance with the battery voltage detection value $V_{dc}$. For example, the voltage amplitude calculator 201 calculates the voltage amplitude command value $V_a^*$ as expressed by Expression (7). The voltage amplitude calculator 201 outputs the voltage amplitude command value $V_a^*$ thus calculated to the dq-axes voltage converter 207.

Math. 7

$$v_{a\_ff} = \frac{V_{dc}}{\sqrt{2}} M^* \quad (7)$$

The voltage phase calculator 202 calculates a voltage phase FF value $\alpha_{ff}^*$ by a feedforward control based on the torque command value T*, the voltage phase FF value $\alpha_{ff}^*$ being indicative of a phase of a voltage that should be supplied to the electric motor 9. The voltage phase calculator 202 of the present embodiment calculates the voltage phase FF value $\alpha_{ff}^*$ by use of the torque command value T*, the rotation speed detection value N, and the battery voltage detection value $V_{dc}$.

For example, a phase table determined in advance is stored in the voltage phase calculator 202. In the phase table, a corresponding voltage phase FF value $\alpha_{ff}^*$ is associated with each operating point specified by the torque command value T*, the rotation speed detection value N, and the battery voltage detection value $V_{dc}$. As the voltage phase FF value $\alpha_{ff}^*$ in the phase table, a value of a voltage phase measured for each operating point of the electric motor 9 in a nominal state in an experiment is used, for example.

When the voltage phase calculator 202 acquires respective parameters of the torque command value T*, the rotation speed detection value N, and the battery voltage detection value $V_{dc}$, the voltage phase calculator 202 refers to the phase table and calculates a voltage phase FF value $\alpha_{ff}^*$ corresponding to an operating point specified by the parameters. Then, the voltage phase calculator 202 outputs the voltage phase FF value $\alpha_{ff}^*$ thus calculated to the voltage phase adder 206.

The torque estimator 203 calculates a torque estimated value $T_{cal}$ based on the d-axis current detection value $i_d$ and the q-axis current detection value $i_q$. A torque table determined in advance is stored in the torque estimator 203. In the torque table, a corresponding torque estimated value $T_{cal}$ is associated with each operating point specified by the d-axis current detection value $i_d$ and the q-axis current detection value $i_q$. As the torque estimated value $T_{cal}$ of the torque table, a measured value of torque that is measured for each operating point of the electric motor 9 that is specified by the d- and q-axis currents in an experiment is used, for example.

When the torque estimator 203 acquires respective parameters of the d-axis current detection value $i_d$ and the q-axis current detection value $i_q$, the torque estimator 203 refers to the torque table and calculates a torque estimated value $T_{cal}$ corresponding to an operating point specified by the parameters. The torque estimator 203 outputs the torque estimated value $T_{cal}$ thus calculated to the torque deviation calculator 204.

The torque deviation calculator 204 calculates a torque deviation $T_{err}$ between the torque command value T* and the torque estimated value $T_{cal}$. The torque deviation calculator 204 of the present embodiment outputs, to the PI controller 205, a value obtained by subtracting the torque estimated value $T_{cal}$ from the torque command value T* as the torque deviation $T_{err}$.

The PI controller 205 executes a torque feedback control such that the torque deviation $T_{err}$ is fed back to a voltage phase command value $\alpha^*$ so that the torque estimated value $T_{cal}$ follows the torque command value T*.

The PI controller 205 of the present embodiment calculates a voltage phase FB value $\alpha_{fb}^*$ based on the torque deviation $T_{err}$ (=T*-$T_{cal}$) as expressed by Expression (8).

The PI controller 205 outputs the voltage phase FB value $\alpha_{fb}*$ thus calculated to the voltage phase adder 206.

Math. 8

$$\alpha_{fb} = \frac{K_{\alpha p}s + K_{\alpha i}}{s}(T^* - T_{cal}) = \left(K_{\alpha p} + \frac{1}{s}\right)T_{err} \quad (8)$$

Note that $K_{\alpha p}$ indicates a proportional gain, and $K_{\alpha i}$ indicates an integral gain. The proportional gain $K_{\alpha p}$ and the integral gain $K_{\alpha i}$ can be found through experimental data, a simulation result, or the like. In Expression (8), $(1/s)T_{err}$ corresponds to an integrator of the PI controller 205, and $(1/s)$ corresponds to an integral value of the torque deviation $T_{err}$.

The PI controller 205 in the present embodiment refers to the control mode flag CNT_FLG. When the control mode flag CNT_FLG indicates that the current vector control is switched to the voltage phase control, the PI controller 205 initializes the integrator of the PI controller 205 based on the initial value $\alpha_{flt}*$ for the voltage phase command value from the initial value calculation portion 13.

More specifically, the PI controller 205 sets a value $(\alpha_{flt}*-\alpha_{ff}*)$ obtained by subtracting the voltage phase FF value $\alpha_{ff}*$ from the initial value $\alpha_{flt}*$ for the voltage phase command value to the integrator of the PI controller 205. That is, the PI controller 205 resets the integral value $(1/s)$ of the PI controller 205 so that an output value of the voltage phase adder 206 becomes the initial value $\alpha_{flt}*$.

Then, the PI controller 205 outputs the value $(\alpha_{flt}*-\alpha_{ff}*)$ obtained by subtracting the voltage phase FF value $\alpha_{ff}*$ from the initial value $\alpha_{flt}*$ for the voltage phase command value to the voltage phase adder 206 as the voltage phase FB value $\alpha_{fb}*$.

The voltage phase adder 206 calculates the voltage phase command value $\alpha*$ by adding the voltage phase FB value $\alpha_{fb}*$ to the voltage phase FF value $\alpha_{ff}*$ from the voltage phase calculator 202. The voltage phase adder 206 outputs the voltage phase command value $\alpha*$ thus calculated to the dq-axes voltage converter 207.

The dq-axes voltage converter 207 converts the voltage phase command value $\alpha*$ and the voltage amplitude command value $V_a*$ output from the voltage amplitude calculator 201 into the d-axis voltage command value $v_{dv}*$ and the q-axis voltage command value $v_{qv}*$ as expressed by Expression (9).

Math. 9

$$\begin{cases} v_{dv}^* = -V_a^*\sin\alpha^* \\ v_{qv}^* = V_a^*\cos\alpha^* \end{cases} \quad (9)$$

The dq-axes voltage converter 207 outputs the d-axis voltage command value $v_{dv}*$ and the q-axis voltage command value $v_{qv}*$ thus converted to the control switching portion 3 as voltage command values for the voltage phase control.

Thus, the voltage phase controlling portion 2 changes the voltage phase command value $\alpha*$ so that the torque deviation $T_{err}$ converges to zero. Hereby, even when the voltage amplitude command value $V_a*$ is fixed in the overmodulation region of a voltage amplitude, the torque of the electric motor 9 can be changed.

Further, when the control on the electric motor 9 is switched from the current vector control to the voltage phase control in accordance with the control mode flag CNT_FLG, the voltage phase controlling portion 2 sets the initial value $\alpha_{flt}*$ found based on the calculation values of the current vector controlling portion 1 to the voltage phase command value $\alpha*$. This makes it possible to reduce torque fluctuation in the electric motor 9 when the control is switched to the voltage phase control.

Note that the present embodiment deals with a configuration in which the voltage phase command value $\alpha*$ is changed in accordance with the torque deviation $T_{err}$. However, the present invention is not limited to this, and a configuration in which the voltage phase command value $\alpha*$ is changed in accordance with a deviation in the supply current to the electric motor 9 may be employed, for example.

Figure 5:
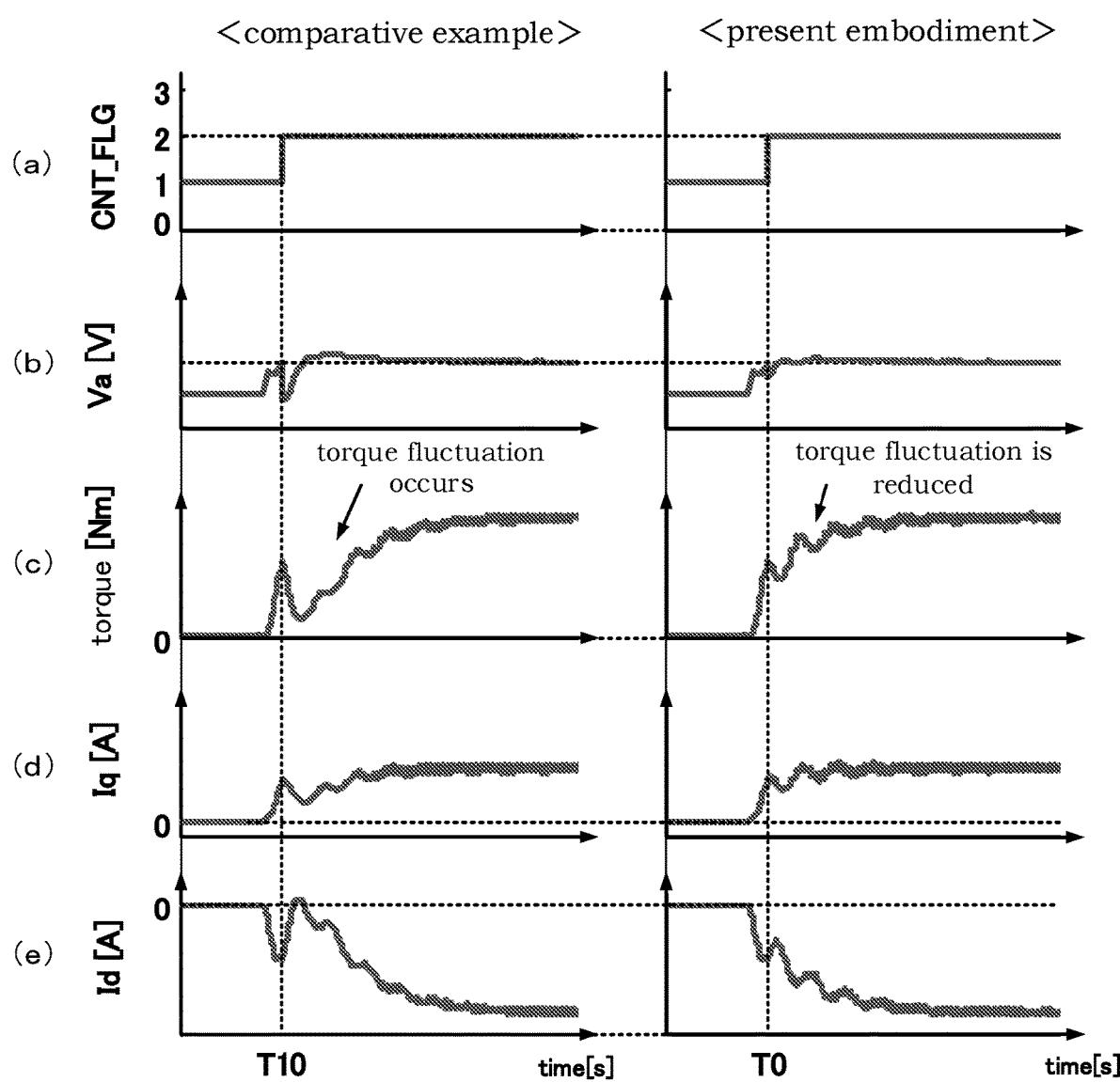
FIG. 5 is a view to describe torque fluctuation in the electric motor, the torque fluctuation being caused when a control is switched to a voltage phase control.

FIG. 5 is a view to describe torque fluctuation in the electric motor 9 at the time when the control is switched to the voltage phase control.

The state change of the electric motor 9 in the present embodiment and its comparative example are illustrated in FIG. 5. The comparative example illustrates a state change of the electric motor 9 when a lowpass filtering process is performed on the whole d-axis and q-axis voltage command values $v_{di}*$ and $v_{qi}*$ that are outputs from the current vector controlling portion 1 at the time when the initial value for the voltage phase command value to be set to the voltage phase controlling portion 2 is calculated.

In the comparative example of FIG. 5, the control mode flag CNT_FLG is changed from "1" to "2" at time T10 as illustrated in FIG. 5(a). Accordingly, the control switching portion 3 switches the control on the electric motor 9 from the current vector control to the voltage phase control.

At this time, the lowpass filtering process is performed on not only the feedback components of the d-axis and q-axis voltage command values $v_{di}*$ and $v_{qi}*$ but also the feedforward components thereof. Accordingly, as illustrated in FIG. 5 (c), the torque of the electric motor 9 sharply decreases.

As described above, the reason why torque fluctuation occurs is because a gap between an actual voltage phase in the electric motor 9 and the initial value for the voltage phase command value becomes large due to the lowpass filtering process being unnecessarily performed on the feedforward components. In this example, as the initial value for the voltage phase command value, a value smaller than the actual voltage phase is calculated by an excessive filtering process.

In the meantime, in the present embodiment of FIG. 5, the lowpass filtering process is performed only on the feedback components of the d-axis and q-axis voltage command values $v_{di}*$ and $v_{qi}*$ by the initial value calculation portion 13 illustrated in FIG. 3. On this account, as illustrated in FIG. 5(a), when the control on the electric motor 9 is switched to the voltage phase control at time T0, the torque fluctuation in the electric motor 9 is reduced as illustrated in FIG. 5(c).

As described above, when the initial value $\alpha_{flt}*$ for the voltage phase command value is calculated, the initial value calculation portion 13 of the present embodiment performs the lowpass filtering process only on the feedback components so as to remove the ripple components of the d-axis and q-axis voltage command values $v_{di}*$ and $v_{qi}*$.

As a result, the ripple components of the d-axis and q-axis voltage command values $v_{di}*$ and $v_{qi}*$ can be easily removed without excess or deficiency, the ripple components being caused due to the current feedback control. This makes it possible to find the initial value for the voltage phase command value with high accuracy. Accordingly, it is possible to reduce the torque fluctuation, in the electric motor 9, that can occur when the control on the electric motor 9 is switched from the current vector control to the voltage phase control.

Figure 6:
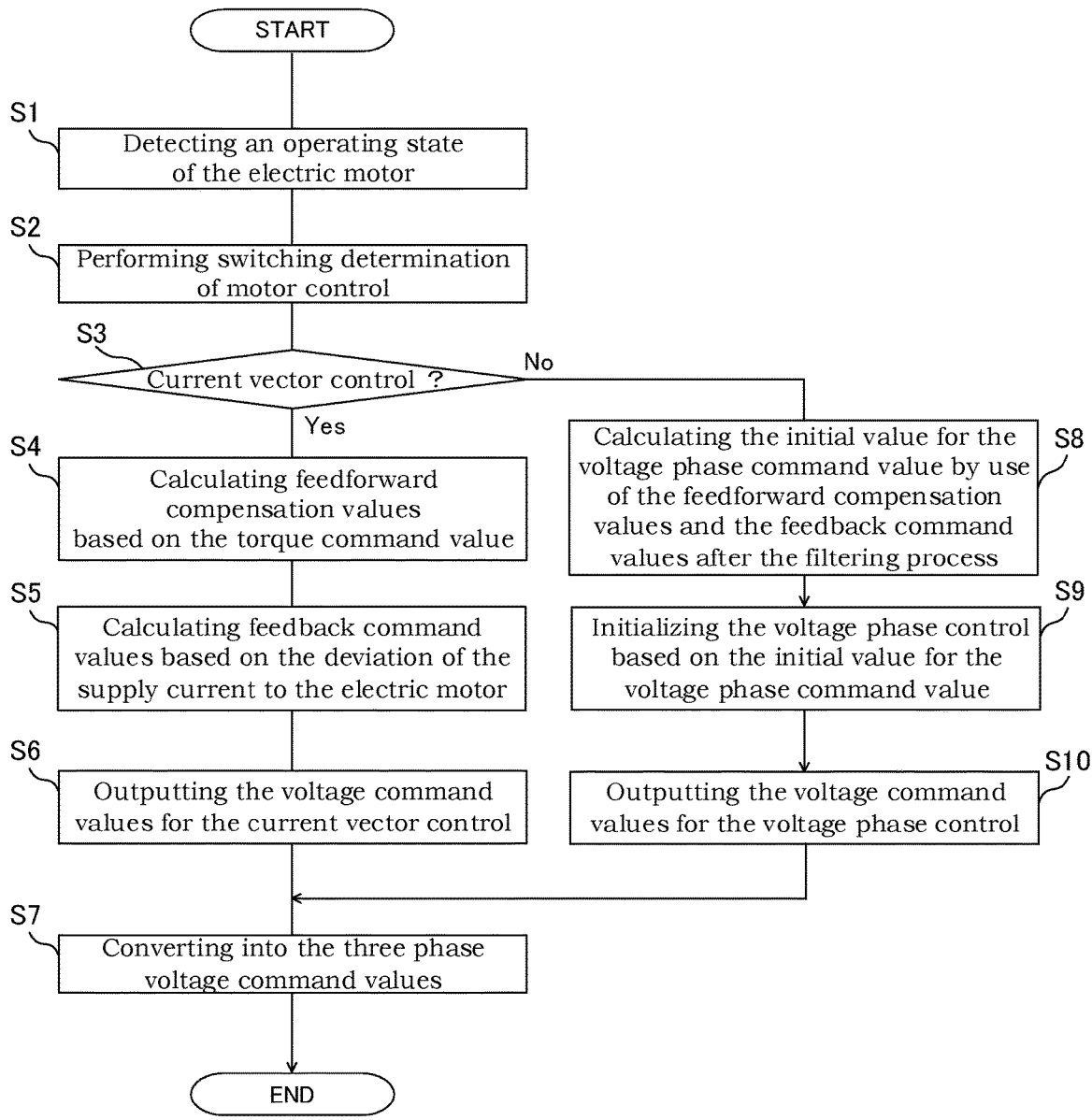
FIG. 6 is a flowchart illustrating an electric motor control method in the present embodiment.

FIG. 6 is a flowchart illustrating an exemplary procedure related to a control method for the electric motor 9 in the present embodiment. The procedure of the present embodiment is performed repeatedly in a predetermined calculation cycle.

In step S1, the control device 100 detects an operating state of the electric motor 9. For example, the control device 100 acquires respective parameters of the torque command value T*, the d-axis current detection value $i_d$, the q-axis current detection value $i_q$, the rotation speed detection value N, the battery voltage detection value $V_{dc}$, and so on.

In step S2, the control device 100 selects, from at least the current vector control and the voltage phase control, the control that should be applied to the electric motor 9 based on values of the respective parameters thus acquired. Then, the control device 100 sets an identifier indicative of the control thus selected to the control mode flag CNT_FLG.

As an example, the control device 100 selects the current vector control when the torque command value T* or the d-axis current detection value $i_d$ is equal to or less than a predetermined threshold. Then, when the torque command value T* or the d-axis current detection value $i_d$ exceeds the predetermined threshold in a state where the current vector control is selected, the control device 100 selects the voltage phase control. Further, instead of or in addition to the above selection condition, the control device 100 may select the control that should be applied to the electric motor 9 based on the q-axis current detection value $i_q$ and the rotation speed detection value N.

In step S3, the control device 100 determines whether the control set to the control mode flag CNT_FLG is the current vector control or the voltage phase control.

In step S4, when the control mode flag CNT_FLG indicates the current vector control, the current vector controlling portion 1 calculates the d-axis and q-axis non-interference voltage values $v_{d\_dcpl}^*$ and $v_{q\_dcpl}^*$ as the feedforward compensation values based on the torque command value T* for the electric motor 9.

In step S5, the current vector controlling portion 1 finds a current deviation in the supply current to the electric motor 9 based on the torque command value T* and calculates d-axis and q-axis current FB voltage command values $v_{di\_fb}^*$ and $v_{qi\_fb}^*$ as the feedback command values based on the current deviation.

In step S6, the current vector controlling portion 1 adds the non-interference voltage values $v_{d\_dcpl}^*$ and $v_{q\_dcpl}^*$ to the d-axis and q-axis current FB voltage command values $v_{di\_fb}^*$ and $v_{qi\_fb}^*$, respectively, and outputs the d-axis and q-axis voltage command values $v_{di}^*$ and $v_{qi}^*$ for the current vector control.

In step S7, the control device 100 converts the d-axis and q-axis voltage command values $v_{di}^*$ and $v_{qi}^*$ into the three phase voltage command values $v_u^*$, $v_v^*$, and $v_w^*$. The inverter 6 supplies three phase alternating current voltages to the electric motor 9 based on the three phase voltage command values $v_u^*$, $v_v^*$, and $v_w^*$ and ends a series of steps of the procedure of the control method for the electric motor 9.

Further, when the control on the electric motor 9 is switched to the voltage phase control in step S4, the control device 100 proceeds to a process of step S8.

In step S8, the control device 100 calculates the initial value $\alpha_{flt}^*$ for the voltage phase command value by use of the feedforward compensation values and the feedback command values after the lowpass filtering process. For example, as illustrated in FIG. 3, the initial value calculation portion 13 calculates the initial value $\alpha_{flt}^*$ for the voltage phase command value by performing the lowpass filtering process only on the d-axis and q-axis current FB voltage command values $v_{di\_fb}^*$ and $v_{qi\_fb}^*$.

In step S9, the control device 100 initializes a state variable for the voltage phase control based on the initial value $\alpha_{flt}^*$ for the voltage phase command value. For example, the control device 100 sets a value obtained by subtracting the voltage phase FF value $\alpha_{ff}^*$ from the initial value $\alpha_{flt}^*$ to the integral value (1/s) of the PI controller 205 illustrated in FIG. 4. The voltage phase FF value $\alpha_{ff}^*$ is a predetermined voltage phase command value calculated based on the torque command value T*.

In step S10, the voltage phase controlling portion 2 executes the feedback control on the voltage phase command value $\alpha^*$ and outputs the d-axis and q-axis voltage command values $v_{dv}^*$ and $v_{qv}^*$ for the voltage phase control. Then, the control device 100 proceeds to the process of step S7, and after the control device 100 executes the process of step S7, the control device 100 ends the control method for the electric motor 9.

In the present embodiment of the present invention, the control device 100 in the control method for the electric motor 9 executes either one control out of the current vector control and the voltage phase control in accordance with the operating state of the electric motor 9 such that the supply power to the electric motor 9 is controlled. The control device 100 outputs the voltage command values $v_{di}^*$ and $v_{qi}^*$ for the current vector control by calculating the feedback command values and the feedforward compensation values based on the torque command value T* for the electric motor 9 like steps S4 to S6.

The feedback command values are parameters indicative of a voltage value of the electric motor 9 that decreases a deviation in the supply current to the electric motor 9 and include the d-axis and q-axis current FB voltage command values $v_{qi\_fb}^*$ and $v_{qi\_fb}^*$, for example. Further, the feedforward compensation values are parameters for compensating the feedback command values and include the d-axis and q-axis non-interference voltage values $v_{d\_dcpl}^*$ and $v_{q\_dcpl}^*$, a torsional vibration compensation value of a drive shaft, and so on.

Then, like step S9, when the control on the electric motor 9 is switched from the current vector control to the voltage phase control, the control device 100 initializes the voltage phase control based on calculation values for the current vector control. Like step S10, the control device 100 executes the feedback control on a predetermined voltage phase command value $\alpha^*$ based on the torque command value T* and outputs the voltage command values $v_{dv}^*$ and $v_{qv}^*$ for the voltage phase control.

Further, like step S8, the control device 100 performs a filtering process on the feedback command values such that low-frequency components of the feedback command values are passed. Then, the control device 100 calculates the initial value $\alpha_{flt}^*$ for the voltage phase command value by use of the feedforward compensation values and the feedback command values on which the filtering process is performed.

With such a configuration, it is possible to restrain torque fluctuation, in the electric motor 9, that can occur when the control on the electric motor 9 is switched to the voltage phase control.

More specifically, with the present embodiment, by performing the filtering process on the feedback command values, it is possible to accurately remove the ripple components of the voltage command values $v_{di}^*$ and $v_{qi}^*$, the ripple components being caused due to the current feedback control. Accordingly, an influence of the ripple components can be reduced when the initial value for the voltage phase control is calculated, thereby making it possible to find the initial value for the voltage phase control with accuracy when the control on the electric motor 9 is switched from the current vector control to the voltage phase control.

In addition to this, in a state where the rotation speed of the electric motor 9 increases moderately, for example, the fundamental wave component of the voltage command value just before switching easily becomes equal to the voltage phase command value just after switching. Accordingly, the control on the electric motor 9 can be switched to the voltage phase control without fluctuating the torque of the electric motor 9 or causing discontinuity in the torque of the electric motor 9 at the time of switching.

In a state where the torque of the electric motor 9 changes sharply, even when the control on the electric motor 9 is switched to the voltage phase control, the filtering process is performed only on the feedback command values, thereby making it possible to decrease a delay in the control on the electric motor 9 due to the filtering process.

That is, with the present embodiment, when the control on the electric motor 9 is switched to the voltage phase control, the torque fluctuation, in the electric motor 9, that is caused due to the current feedback control can be reduced, and an influence of the delay in the control on the electric motor 9 due to the filtering process can be reduced.

Further, in the present embodiment, as described with reference to FIG. 4, the control device 100 updates, based on the initial value $\alpha_{fit}^*$ for the voltage phase command value, the integral value of the PI controller 205 that executes the feedback control in the voltage phase controlling portion 2.

Hereby, at the time when the control on the electric motor 9 is switched from the current vector control to the voltage phase control, a gap between a voltage phase component of the voltage command value for the current vector control and the voltage phase command value for the voltage phase control can be reduced. This makes it possible to restrain the torque fluctuation, in the electric motor 9, that occurs when the control is switched to the voltage phase control.

Further, in the present embodiment, as illustrated in FIG. 4, the voltage phase controlling portion 2 executes the feedback control such that the torque generated in the electric motor 9 is fed back to the voltage phase command value $\alpha^*$. The initial value calculation portion 13 sets, to the integral value of the PI controller 205, a reset value obtained by subtracting, from the initial value $\alpha_{fit}^*$ for the voltage phase command value, the voltage phase FF value $\alpha_{ff}^*$ as the feedforward component of the voltage phase command value $\alpha^*$ calculated by the voltage phase controlling portion 2.

As such, since the feedforward component in the voltage phase controlling portion 2 is taken into consideration, it is possible to further reduce a difference between the voltage phase command value $\alpha^*$ calculated by the voltage phase controlling portion 2 and the initial value $\alpha_{fit}^*$, for the voltage phase command value, that is obtained from the calculation values of the current vector controlling portion 1.

The embodiments of the present invention have been described above, but the embodiments just show some applications of the present invention and are not intended to limit the technical scope of the present invention to the concrete configurations of the embodiments. Further, the above embodiments can be combined in a given manner.

The invention claimed is:

1. An electric motor control method for executing either one of a current vector control and a voltage phase control in accordance with an operating state of an electric motor such that electric power to be supplied to the electric motor is controlled, the electric motor control method comprising:
a current controlling step of outputting a voltage command value for the current vector control by calculating a feedback command value and a feedforward compensation value based on a torque command value for the electric motor, the feedback command value being indicative of a voltage value for decreasing a deviation in a supply current to the electric motor, the feedforward compensation value being a value for compensating the feedback command value;
a switching controlling step of initializing the voltage phase control based on a calculation value for the current vector control when a control on the electric motor is switched from the current vector control to the voltage phase control; and
a voltage phase controlling step of outputting a voltage command value for the voltage phase control by executing a feedback control on a predetermined voltage phase command value based on the torque command value for the electric motor, wherein
in the switching controlling step,
a filtering process is performed on the feedback command value such that a low-frequency component of the feedback command value is passed, and
an initial value for the voltage phase command value is calculated by use of the feedforward compensation value and the feedback command value on which the filtering process is performed.

2. The electric motor control method according to claim 1, wherein
in the switching controlling step, an integral value of the feedback control is updated based on the initial value.

3. The electric motor control method according to claim 2, wherein:
the feedback control is a control executed such that torque generated in the electric motor is fed back to the voltage phase command value; and
in the switching controlling step, a value obtained by subtracting a feedforward component of the voltage phase command value from the initial value is set to the integral value.

4. An electric motor control device for executing either one of a current vector control and a voltage phase control in accordance with an operating state of an electric motor such that electric power to be supplied to the electric motor is controlled, the electric motor control device comprising:
an inverter configured to supply alternating current power to the electric motor based on a control on the electric motor;
a sensor configured to detect a current supplied from the inverter to the electric motor;
a controller configured to execute the current vector control by calculating a feedback command value and a feedforward compensation value based on a torque command value for the electric motor, the feedback command value being indicative of a voltage value for decreasing a deviation in a supply current to the electric motor, the feedforward compensation value being a value for compensating the feedback command value; and a filter configured to perform a filtering process on the feedback command value such that a low-frequency component of the feedback command value is passed, wherein when the control on the electric motor is switched to the voltage phase control, the controller initializes the voltage phase control based on the feedforward compensation value and an output from the filter.

* * * * *